United States Patent [19]

Okamura

[11] Patent Number: 4,984,082
[45] Date of Patent: Jan. 8, 1991

[54] CIRCUIT FOR DISPLAYING PICTURE OF MULTIPLE CHANNELS

[75] Inventor: Masatomo Okamura, Saitama, Japan

[73] Assignee: Kabushiki Kaisha Toshiba, Kawasaki, Japan

[21] Appl. No.: 370,008

[22] Filed: Jun. 22, 1989

[30] Foreign Application Priority Data

Jun. 29, 1988 [JP] Japan .................................. 63-162917

[51] Int. Cl.$^5$ ...................... H04N 5/272; H04N 5/450
[52] U.S. Cl. ...................................... 358/183; 358/22
[58] Field of Search .............. 358/183, 22, 155, 193.1, 358/36, 166, 167

[56] References Cited

U.S. PATENT DOCUMENTS

| | | | |
|---|---|---|---|
| 4,543,614 | 9/1985 | Chen | 358/193.1 |
| 4,623,915 | 11/1986 | Bolger | 358/22 |
| 4,636,864 | 1/1987 | Annegarn et al. | 358/22 |
| 4,638,360 | 1/1987 | Christopher et al. | 358/183 |
| 4,665,438 | 5/1987 | Miron et al. | 358/183 |
| 4,682,234 | 7/1987 | Naimpally | 358/183 |
| 4,748,504 | 5/1988 | Ikeda et al. | 358/22 |
| 4,855,833 | 8/1989 | Kageyama et al. | 358/183 |

FOREIGN PATENT DOCUMENTS

| | | |
|---|---|---|
| 0230787 | 8/1987 | European Pat. Off. |
| 257681 | 12/1985 | Japan . |
| 13175 | 1/1987 | Japan . |
| 154884 | 7/1987 | Japan . |
| 179671 | 7/1988 | Japan . |
| 2026278 | 1/1980 | United Kingdom . |

Primary Examiner—Tommy P. Chin
Attorney, Agent, or Firm—Cushman, Darby & Cushman

[57] ABSTRACT

If the period of a horizontal synchronizing signal component output from a synchronizing separator circuit differs from a predetermined horizontal trace period, a decision-making circuit determines that a channel with no signal has been received, making high the frequency of a clock for generation of a write address. If the period of the horizontal synchronizing signal component equals the predetermined horizontal trace period, the decision-making circuit makes low the frequency of a clock for generation of a write address. Accordingly, in a multiple-channel picture display mode, in the case of the reception of a channel with no signal, writing for one horizontal trace period is completed in a shorter time than writing in the case of reception of a channel with a signal. The received signal of each channel is correctly written into a picture memory in each horizontal trace period irrespective of variations in the dispersion of the period of the horizontal synchronizing signal component. Accordingly, it is possible to eliminate the problem that, as in the prior art, the next horizontal synchronizing signal component appears during the current write period to cause multiple-channel pictures to be displayed at locations offset from corresponding display frames. It is, therefore, possible to correctly identify the picture information of each channel with a signal.

6 Claims, 5 Drawing Sheets

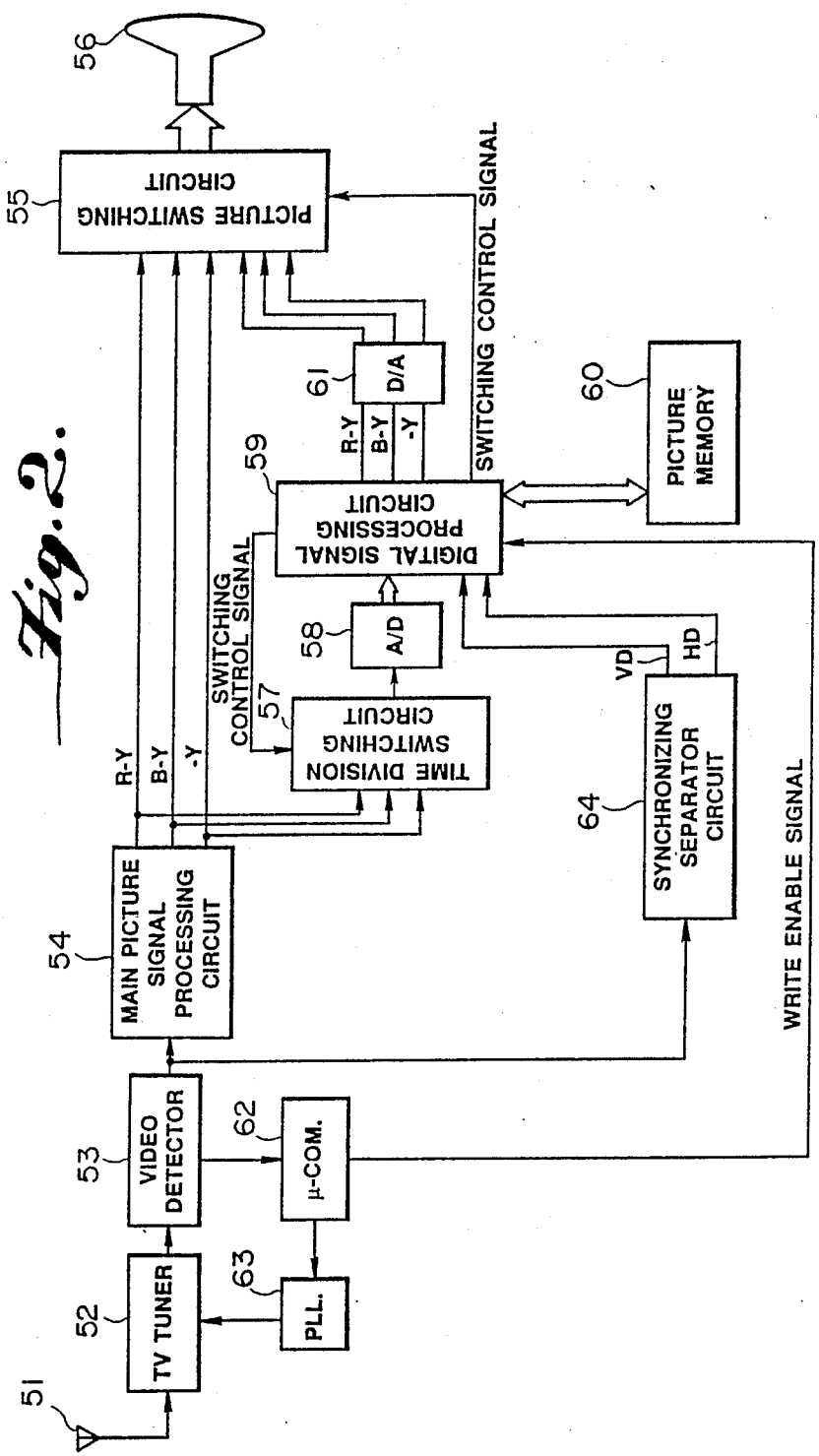

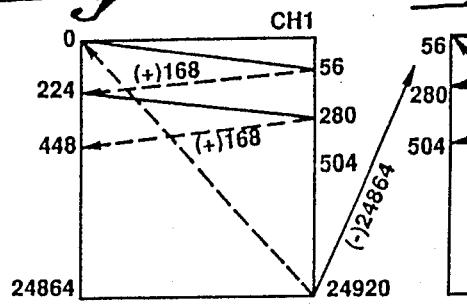

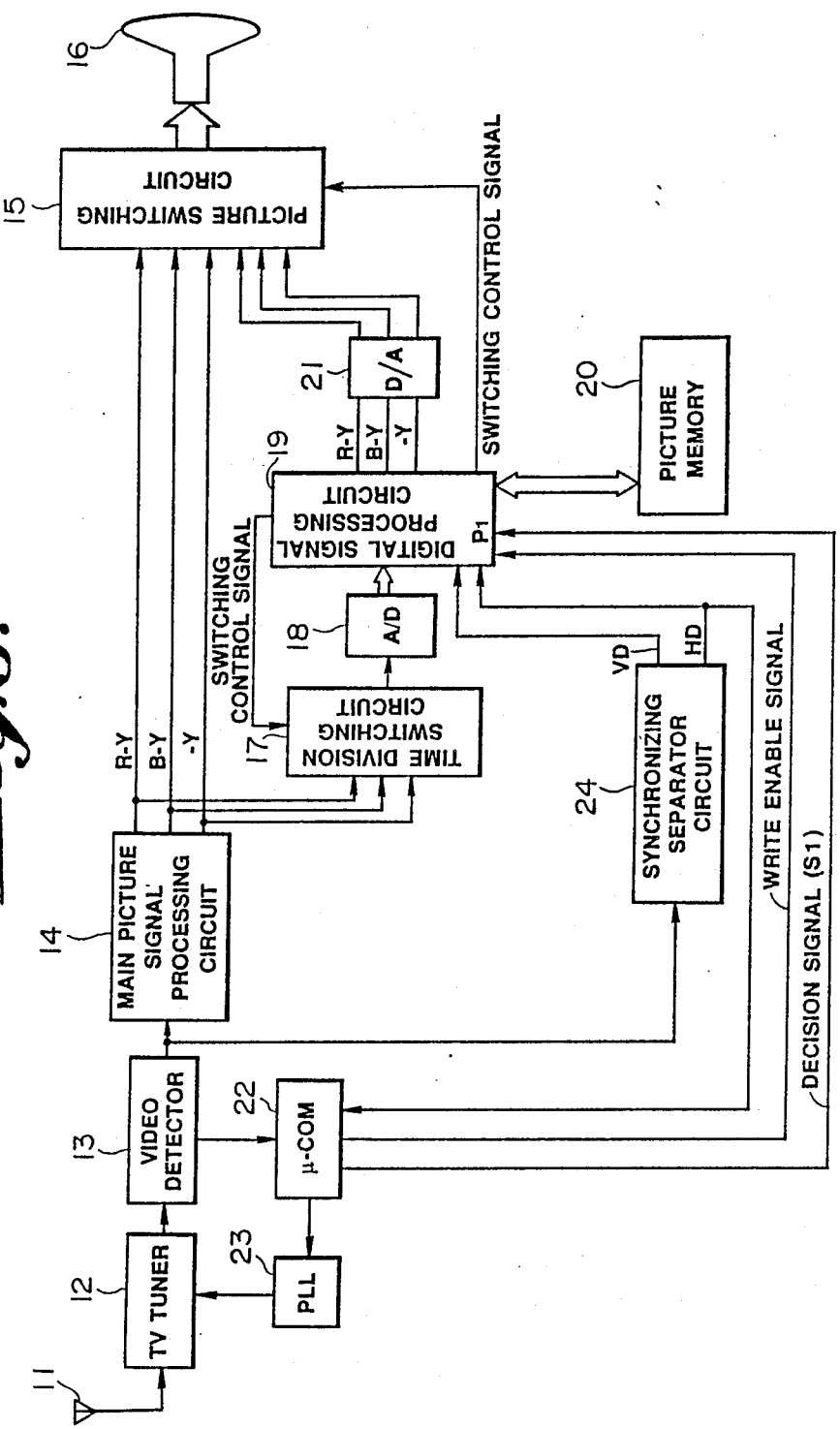

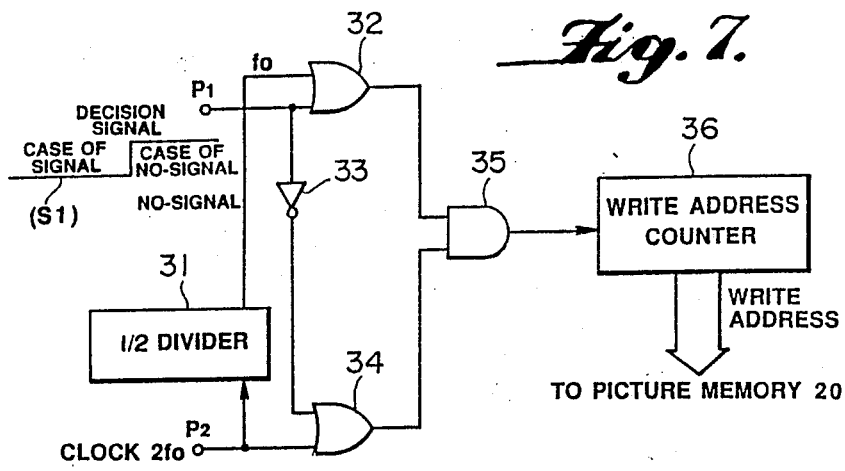
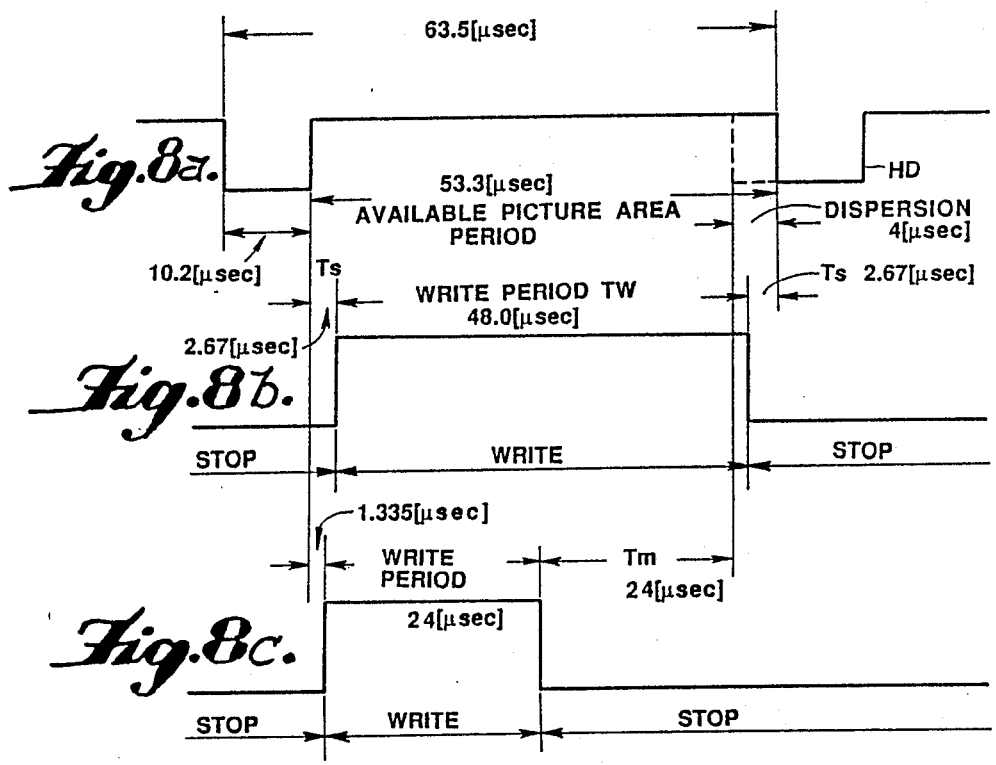

CIRCUIT FOR DISPLAYING PICTURE OF MULTIPLE CHANNELS

BACKGROUND OF THE INVENTION

1. Field of the Invention

The present invention relates to a multiple-channel picture display circuit capable of displaying, on a television screen, the received pictures of a plurality of channels in the form of separate pictures.

2. Related Art Statement

A multiple-channel picture display circuit has recently been provided in order to functionally supplement channel search operations of television receivers. As shown in FIG. 1, the picture information obtained by receiving the signals of a plurality of channels are simultaneously displayed in the form of separate pictures, whereby it is possible to identify a channel with a particular signal and corresponding picture information. FIG. 1 shows an example in which multiple-channel pictures which differ from a main picture are displayed on a portion of a main picture area as sub-picture information. Japanese Patent Application No. 113612/1984 filed by Sharp Corporation (Japanese Patent Laid Open No. 257681/1985) discloses that the whole picture area of a television receiver is divided into equal parts to display multiple-channel pictures.

FIG. 2 is a block diagram showing the above-described mutiple-channel picture display circuit.

In FIG. 2, a desired channel signal is selected by means of a Tv tuner 52 to convert a high frequency signal induced in an antenna 51 into an intermediate frequency (IF) signal, and the IF signal is supplied to a video detector circuit 53. The output of the video detector circuit 53 is supplied to a main picture signal processing circuit 54 which serves to separately process a chroma signal and a luminance signal, and the supplied signal is separated into an R-Y signal, a B-Y signal, and a -Y signal. These R-Y, B-Y and -Y signals are supplied to a cathode ray tube (CRT) 56 through a picture switching circuit 55, and are reproduced on the CRT 56 as main picture information.

Reference numeral 57 denotes a time division switching circuit for converting the R-Y, B-Y, and luminance signals -Y output from the main picture signal processing circuit 54 into a time-division multiplexed signal by way of the switching operation of a multiplexer. The output of the time division switching circuit 57 is converted into a digital signal by an analog/digital converter (hereinafter referred to as the "A/D converter") 58 and is then supplied to a digital signal processing circuit 59. The digital signal processing circuit 59 generates an address signal and writes the digitized picture signal into a picture memory 60 which is provided for storing a picture to be displayed and into which picture information for multiple channels can be written. Also, the digital signal processing circuit 59 effects reading from the picture memory 60 in a controlled manner, and supplies the time division multiplexed picture signal written into the picture memory 60 to a picture switching circuit 55 through a digital/analog converter (hereinafter referred to as the "D/A converter") 61. In response to a switching control signal from the digital signal processing circuit 59, the picture switching circuit 55 selectively outputs the main picture signal and the multiple-channel picture signal by a switching operation to display a picture such as that shown in FIG. 1. During the above operation, the digital signal processing circuit 59 is supplying predetermined switching control signals to the time division switching circuit 57.

Reference numeral 62 denotes a tuning microcomputer including CPU A microcomputer 62 provides control over the receiving operation of the TV tuner 52 through a phase-locked loop (PLL) circuit 63. Also, the microcomputer 62 supplies a write enable signal to the aforesaid digital processing circuit 59. The digital signal processing circuit 59 effects writing into the picture memory 60 while the write enable signal is present.

Reference numeral 64 denotes a synchronizing separator circuit for separating a synchronizing signal from the output from the video detector circuit 53. Horizontal and vertical synchronizing signal components HD and VD, which have been output from the synchronizing separator circuit 64, are supplied to the digital signal processing circuit 59. The digital signal processing circuit 59 utilizes the synchronizing signal components HD and VD as a synchronizing signal which constitutes a reference signal for generating the write address signal mentioned above.

FIG. 3 is a timing chart which diagrammatically shows the operation of displaying four-channel multiple pictures such as those shown in FIG. 1. In FIG. 3, part A shows a receiving operation through which the received signals supplied from the PLL circuit 63 are sequentially switched from one channel to another to allow individual channels to be received in the order of, for example, channel 1, channel 2, ..., at predetermined time intervals Part B represents the write enable signal from the microcomputer 62, and the write enable signal is generated each time one channel is received. As shown in Part C, the write operation is effected in synchronization with the period of generation of the write enable signal, and the received signal of channels 1 to 4 can be written into the picture memory 60.

FIG. 4 shows an address map used for writing the received picture information for four pictures of the channels 1 to 4.

Parts a, b, c and d correspond to channels 1, 2, 3 and 4, respectively. As can be seen from FIG. 4, the number of addresses assigned to the received signal of each channel is fifty six per horizontal trace period.

First, when the picture information of channel 1 is to be written, the digital signal processing circuit 59 processes the vertical synchronizing signal of channel 1 and resets the value of its vertical address counter to address "0". Each time the horizontal synchronizing signal component HD of channel 1 is processed in the digital signal processing circuit 59, the vertical address counter increments its count by (+) 168 and effects writing of picture information for one horizontal trace period. When such horizontal writing is repeated and a picture for one field is written, the vertical address counter increments the write address by (−) 24920 and resets the value of the write address to "0". Thus, writing of picture information for the next field is again carried out. When the microcomputer 62 stops generating the write enable signal, the digital signal processing circuit 59 processes the next vertical synchronizing signal component VD after having completely written the one-field picture information of channel 1, and increments the value of the write address counter by (−) 24864. Thus, the write address counter is set to "56" which is a write start address for channel 2.

When the writing operation proceeds from channel 1 to channel 2, channel 2 is received through the PLL circuit 63 under the control of the microcomputer 62. When channel 2 is received, the microcomputer 62 outputs a write enable signal and the vertical address counter writes the received signal of channel 2 from write address 56 into the picture memory 60. Writing of channels 3 and 4 is also effected in a similar manner.

The resultant address allocation in the picture memory 60 is as follows: The addresses assigned to the right-hand end of the picture area of channel 1 coincide with those assigned to the left-hand end of the picture area of channel 2, the addresses assigned to the right-hand end of the picture area of channel 2 coincide with those of the left-hand end of the picture area of channel 3, the addresses assigned to the right-hand end of the picture area of channel 3 coincide with those of those assigned to the left-hand end of the picture area of channel 4, and the addresses assigned to the right-hand end of the picture area of channel 4 coincide with those assigned to the left-hand end of the picture area of channel 1. Accordingly, the multiple-channel picture display area is divided into four segments. This address allocation makes it easy to count, during readout operation, readout addresses by utilizing, as triggers, the horizontal synchronizing signal components contained in the main picture signal.

An address counting operation for one horizontal retrace period will now be explained with reference to FIG. 5. In FIG. 5, part (a) represents a horizontal synchronizing signal output, and part (b) represents the period of write operation corresponding to part (a). The digital signal processing circuit 59 utilizes the horizontal synchronizing signal component HD as a trigger to cause the write address counter to execute a counting operation. During the period of the horizontal synchronizing signal component HD, no clock for address counting is generated. When the process proceeds to the succeeding horizontal trace period after the aforesaid period has passed, a clock for address counting is generated. In general, the length of a horizontal retrace period is 16% of one horizontal trace period of duration 63.5 $\mu$sec. Accordingly the period of the signal component HD is approximately 10.2 $\mu$sec and an available picture area period is therefore approximately 53.3 $\mu$sec. The length of a write period TW is determined by an overscanning ratio. In this example, if the horizontal overscanning ratio is assumed to be 10%, the write period TW of the received signal is $$TW = 53.3 \ \mu sec \times (1 - 0.1) \quad (1)$$
$$\approx 48.0 \ \mu sec$$

From (53.3−48.0)/2, a write stop period Ts within the available picture area period is $$Ts = 2.67 \ \mu sec \quad (2)$$

In other words, in order to accommodate the overscanning ratio, the digital signal processing circuit 59 writes, into the picture memory 60, one-horizontal-trace signal which excludes its leading portion of duration of approximately 2.67 $\mu$sec which follows the leading signal component HD and its trailing portion of duration of approximately 2.67 $\mu$sec which is followed by the trailing signal component HD.

It is assumed here that a channel with no signal has been received. In this case, the synchronizing separator circuit 64 outputs noise as its synchronizing signal output, but noise pulses each having duration close to one horizontal trace period appear because of the nature of a time-constant circuit for use as the synchronizing separator. Although depending upon the performance of the synchronizing separator circuit 64, the period of such a noise pulse commonly deviates from a normal period by an amount of ±2 $\mu$sec to ±4 $\mu$sec.

Accordingly, if the period of the noise pulse becomes shorter than the normal period by Ts (2.67 $\mu$sec) or more (for example, by 4 $\mu$sec) as shown by the dashed line of FIG. 5(a), the digital signal processing circuit 59 will increment the write address by (+) 168 due to the generation of the noise pulse before the number of addresses (fifty six) required for one horizontal trace period has been counted. This leads to the phenomenon in which no picture data for the next horizontal trace period is written to predetermined addresses; for example, picture data of a channel with no signal is written to addresses to which picture data of a channel with a particular signal is to be written. As a result, in a multiple-channel display mode, a number of malfunctions may take place; for example, a picture pattern is offset from a corresponding display frame, and a picture of a channel with no signal may be displayed at a display position allocated for a channel with a particular signal.

In order to prevent such malfunctions from occurring when a channel with no signal is received, it is possible to utilize a method in which the write stop period Ts is set to a period longer than the aforesaid period 2.67 $\mu$sec, for example, about 4.5 $\mu$sec to about 5 $\mu$sec so that the counting of the required number (fifty six) of write addresses can be completed even if the amount of dispersion of the period of the synchronizing signal component HD becomes small by a maximum of 4 $\mu$sec. However, the fact that the write stop period Ts is set to a somewhat long period means that the write period TW is shortened, causing the picture information to be lost by an amount equivalent to not less than the overscanning ratio of 16%. As a result, the amount of information will be insufficient.

As described above, television receivers of the type having the conventional multiple-channel picture display function have the problem that malfunctions in writing are caused by the dispersion of the horizontal synchronizing component HD due to noise pulses during the reception of a channel with no signal. Moreover, if the write stop period is extended and the write period TW is shortened, it is necessary to eliminate the portion of a picture which exceeds the overscanning ratio. The result is a lack of the amount of information.

SUMMARY OF THE INVENTION

It is, therefore, an object of the present invention to provide a multiple-channel picture display circuit which can solve the above-described problems and which can prevent malfunctions from occurring in writing operation without reducing the amount of information of a received channel with a particular signal.

A circuit for displaying pictures of multiple channels according to the present invention is, in preferred form, characterized by comprising television-signal receiving means arranged to receive a television broadcasting signal and then to output a received signal which has been subjected to video detection; a picture memory into which is written signal information obtained by sequentially receiving broadcasting signals of a plurality of channels in a time-division fashion and subjecting the broadcasting signals to video detection in the television-signal receiving means; synchronizing separator means for separating a synchronizing signal containing a horizontal synchronizing signal component from the video-detected signal; decision-making means for making a decision as to the presence or absence of each of the received broadcasting signals of the plurality of channels by utilizing the horizontal synchronizing signal component to thereby output a decision signal, the decision signal output in the presence of the broadcasting signal differing from the decision signal output in the absence of the broadcasting signal; picture memory controlling means including an address counter for providing access to the picture memory and means for generating a clock signal for use in the address counter, the means for generating the clock signal being capable of selectively generating a clock signal of first frequency and a clock signal of second frequency higher than the first frequency, the picture memory controlling means being arranged to utilize the decision signal supplied from the decision-making means to supply the clock signal of first frequency to the address counter in the presence of a signal and to supply the clock signal of second frequency to the address counter in the absence of a signal; and display means capable of displaying pictures of the plurality of channels on the basis of the signal information read from the picture memory.

BRIEF DESCRIPTION OF THE DRAWINGS

FIG. 2 is a block diagram showing the construction of one example of a conventional multiple-channel picture display circuit;

FIG. 4 is a mapping chart of a picture memory used in the present invention;

FIG. 5 is a timing chart which serves to illustrate the operation of the circuit of FIG. 2;

FIG. 6 is a block diagram showing the construction of one embodiment of a multiple-channel picture display circuit according to the present invention;

FIG. 7 is a circuit diagram which serves to illustrate a portion of the construction of FIG. 6 in detail; and FIG. 8 is a timing chart which serves to illustrate the write operation according to the present invention.

DETAILED DESCRIPTION OF THE PREFERRED EMBODIMENT

Figure 1:
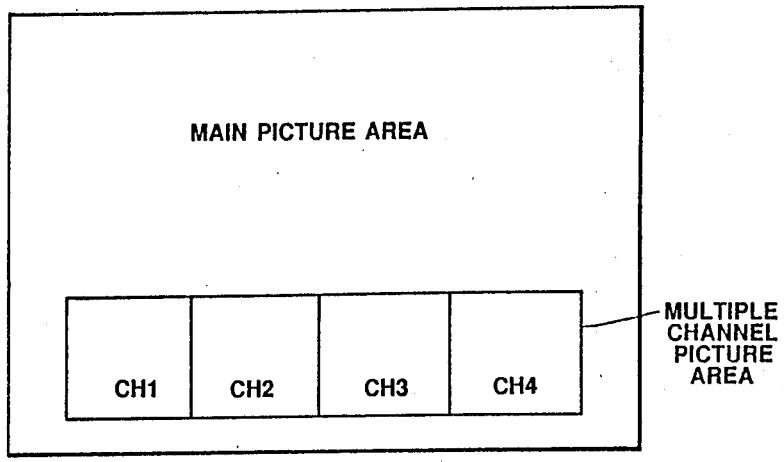
FIG. 1 is a diagrammatic view which serves to illustrate an example of multiple-channel display provided on a CRT screen.
Figure 3A:
FIG. 3 is a timing chart which serves to illustrate the operation of the circuit of FIG. 2.
Figure 3B:
Figure 3C:

FIG. 6 is a block diagram showing the construction of one embodiment of a multiple-channel picture display circuit according to the present invention, and FIG. 7 is a circuit diagram which serves to illustrate the details of a portion of the embodiment of FIG. 6.

In FIG. 6, a television broadcasting signal antenna is denoted by 11, a television tuner by 12, a video detector circuit by 13, and a main picture signal processing circuit by 14. Reference numeral 15 denotes a picture switching circuit for effecting switching between the main picture signal supplied from the main picture signal processing circuit 14 and a multiple-channel picture signal, and reference numeral 16 denotes a CRT for displaying the output from the picture switching circuit 15. A microcomputer 22 includes CPU for controlling the receiving operation of the TV tuner 12, and controls the TV tuner 12 through the PLL circuit 23.

The main picture signal processing circuit 14 outputs two color-difference signals R-Y, B-Y and a luminance signal -Y, supplying them to the time division switching circuit 17 as well. The time division switching circuit 17 consists of a multiplexer and serves to effect time-division processing of each of the R-Y, B-Y and -Y signals and supply it to the A/D converter 18. The A/D converter 18 outputs a digital picture signal in the form of a composite video signal and supplies it to the digital signal processing circuit 19. The output of the video detector circuit 13 is supplied to a synchronizing separator circuit 24, and the vertical and horizontal synchronizing signal outputs obtained by separation are input to the digital signal processing circuit 19 as a reference signal for generation of a write address signal or the like.

The aforesaid microcomputer 22 receives the horizontal synchronizing signal output HD from the synchronizing separator circuit 24 and makes a decision as to the period of this synchronizing signal component HD. Thus, the microcomputer 22 supplies a decision signal S1, which represents the decision as to the period of the horizontal synchronizing signal output HD, to the terminal P1 of the digital signal processing circuit 19, and a write enable signal to the digital signal processing circuit 19. The digital signal processing circuit 19 generates a write address on the basis of the write enable signal and the decision signal S1.

FIG. 7 is a circuit diagram showing the construction of a circuit for generating a clock for use in counting write addresses in the digital signal processing circuit 19. In FIG. 7, a terminal P2 is an input terminal through which a clock used for counting write addresses is input. The frequency of this clock is represented by 2f0.

In the meantime, the decision signal S1 output from the microcomputer 22 is supplied to the terminal P1. The decision signal S1 goes to its high level when a channel with no signal is received, while when a channel with a signal is received, the decision signal S1 goes to its low level.

The above decision signal S1 is supplied to one input terminal of an OR gate 32. A clock of frequency f0 obtained by passing the clock from the input terminal P2 through a ½ divider 31 is supplied to the other input terminal of the OR gate 32. The OR output from the OR gate 32 is supplied to one input terminal of an AND gate 35. The aforesaid clock of frequency 2f0 from the input terminal P2 is supplied to one input terminal of an OR gate 34. The above decision signal S1 is supplied to the other input terminal of the OR gate 34 through a NOT gate 33. The OR output from the OR gate 34 is supplied to the other input terminal of the AND gate 35. The AND output from the AND gate 35 is supplied as a count input to a write address counter 36.

The digital signal processing circuit 19 reads out the data written into the picture memory 20 on the basis of the timing of a synchronizing signal associated with a main picture signal, and supplies the result to the picture switching circuit 15 through the D/A converter 21. Thus, the picture signal supplied from the digital signal processing circuit 19 is displayed as a sub-picture in a multiple-channel picture area.

In the multiple-channel picture display circuit having the above construction, the microcomputer 22 makes a decision as to the period of the horizontal synchronizing signal component HD which is separated by, and output from, the synchronizing separator circuit 24. If the period of the horizontal synchronizing signal output HD coincides with the normal period or if it is accommodated within the allowable range of dispersion relative to the normal period, the microcomputer 22 determines that a channel with a signal has been received (the case of signal) and outputs a low-level decision signal as the decision signal S1. If the period of the horizontal synchronizing signal output HD exceeds the allowable range of dispersion, the microcomputer 22 determines that a channel with no signal has been received (the case of no-signal) and outputs a high-level decision signal as the decision signal S1.

In the circuit of FIG. 7, since the decision signal S1 applied to the terminal P1 is held in a high-level state during the reception of a channel with no signal, the output from the OR gate 32 is always held in a high-level state and the clock of frequency f0 from the ½ divider 31 is not output from the OR gate 32. Since the output of the NOT gate 33 goes to a low level, the clock of frequency 2fO from the terminal P2 is obtained through the OR gate 34. At this time, since the output of the OR gate 32 is at its high level, the input to one input terminal of the AND gate 35 goes to its high level and the clock of frequency 2f0 which has passed through the OR gate 34 is supplied to the write address counter 36, whereby the write address counter 36 generates a write address.

During the reception of a channel with a signal, since the decision signal S1 is held in a low-level state the clock output of frequency f0 from the ½ divider 31 is obtained through the OR gate 32. In the meantime, the output of the NOT gate 33 is held in a high-level state and the output of the OR gate 34 is always held in a high-level state so that the clock of frequency 2f0 is not Output from the OR gate 34. At this time, the clock Of frequency f0 is provided at the output of the AND gate 35, and the write address counter 36 generates a write address on the basis of the clock of frequency f0. Thus, upon reception of a channel with no signal, the digital signal processing circuit 19 accesses the picture memory 20 with reference to the write address based on the clock of frequency 2f0 and, upon reception of a channel with a signal, with reference to the write address based on the clock of frequency f0.

As described above, the frequency of the clock which is input to the write address counter 36 upon the reception of a channel with no signal is double the frequency of the clock which is input upon the reception of a channel with a signal. FIG. 8 is a timing chart of writing operation in the above-described circuit arrangement, and illustrates the timing of the operation of writing a picture signal per horizontal trace period upon the reception of a channel with a signal and upon the reception of a channel with no signal.

In FIG. 8, part (a) represents a horizontal synchronizing signal output, part (b) represents a write period for the reception of a channel with a signal, and part (c) represents a write period for the reception of a channel with no signal.

For the reception of a channel with a signal, the opposite write stop periods within the available picture area period are each set to 2.67 μsec in a manner similar to that explained in connection with FIG. 5b. Accordingly the received signal can be written during the 48-μsec period between the opposite write stop periods. The write addresses used in this write period are generated on the basis of the clock of frequency f0 Since the dispersion of the horizontal synchronizing signal component is less than that of a horizontal synchronizing signal component for the case of reception of a channel with no signal, such dispersion is absorbed within the overscanning period whereby it is ensured that counting for one horizontal trace period is completed.

For the reception of a channel with no signal, since the input clock of the write address counter 36 is of frequency 2f0, the write period becomes 24 μsec which is equivalent to half the write period for the reception of a channel with a signal, as shown in part (c) of FIG. 8. Since the time required from the rising of the horizontal synchronizing signal component HD to the start of writing operation is 2.67 μsec in the case of reception of a channel with a signal, the write stop period for the case of reception of the channel with no signal becomes 1.3335 μsec which is half that of the write stop period for the above-described case. Accordingly, if the amount of dispersion of the separated horizontal synchronizing component HD is set to a maximum of ±4 μsec, a time margin Tm occurs between the end of write address counting and the beginning of the next horizontal synchronizing signal component HD. This time margin Tm is $$Tm = 53.3 - 4 - 1.335 - 24 \approx 24 \, \mu sec \qquad (3)$$

As can be seen from the expression (3), the time margin Tm equivalent to a minimum of 24 μsec can be gained, whereby, unlike the conventional arrangement, the next horizontal synchronizing signal component HD does not appear during counting of write addresses. Accordingly, error-free address counting is enabled so that it is possible to eliminate the deviation of a picture from a corresponding display frame and to prevent a received signal of a channel with no signal from being displayed on a display frame for a channel with a signal.

In this invention, the amount of information in the horizontal direction during the reception of a channel with no signal is half the amount of information in the horizontal direction during the reception of a channel with a signal. However, even if the amount of information is reduced, there is no problem in practice since the picture of the channel with no signal consists of noise. When a channel with a signal has been received, the clock frequency of the write address counter 36 is switched to a ½ frequency on the basis of the decision signal S1 supplied from the microcomputer 22. Accordingly, the length of the write period becomes half that of the write period in the case of reception of a channel with no signal whereby picture information can be written at an overscanning ratio equivalent to that of a normal TV signal.

It is to be noted that the arrangement of the circuit of FIG. 7 for selecting a clock of frequency suitable for the write address counter 36 in response to the decision signal is not limited to the one used in the above embodiment, and various other circuit arrangements may be employed. Moreover, the clock frequency for the case of reception of a channel with a signal need not necessarily be half that for the case of reception of a channel with no signal. As the clock frequency for a channel with no signal is made higher than the clock frequency for a channel with a signal, the time margin Tm may be extended.

What is claimed is:

1. A circuit for displaying pictures of multiple channels, comprising:

television-signal receiving means arranged to receive a television broadcasting signal and then to output a signal which has been subjected to video detection;

a picture memory for storing signal information obtained by sequentially receiving broadcasting signals of a corresponding plurality of channels in a time-division fashion;

synchronizing separator means for separating a synchronizing signal containing a horizontal synchronizing signal component from said video-detected signal;

decision-making means for outputting a write enable signal and a decision signal representing a decision as to the presence of absence of each of said received broadcasting signals within said corresponding plurality of channels, said decision-making means utilizing said horizontal synchronizing signal component to thereby output said decision signal, said decision signal when output in the presence of said broadcasting signal differing from said decision signal when output in the absence of said broadcasting signal;

picture memory controlling means for writing said signal information into said picture memory in response to said write enable signal, said picture memory controlling means including an address counter for providing access to said picture memory and means for generating a clock signal for use in said address counter, said means for generating said clock signal being responsive to said decision signal and generating a clock signal of first frequency to said address counter in the presence of said broadcasting signal and a clock signal of second frequency higher than said first frequency to said address counter in the absence of said broadcasting signal; and display means capable of displaying pictures of said plurality of channels on the basis of said signal information read from said picture memory.

2. The circuit according to claim 1, wherein said television signal receiving means includes means for sequentially receiving different channels which are spaced at an interval equivalent to a predetermined period.

3. The circuit according to claim 2, wherein said receiving means includes a microcomputer.

4. The circuit according to claim 1, further comprising analog/digital converter means for conveying said signal video-detected by said television signal receiving means into said signal information to be stored in said picture memory, and digital/analog converter means for converting said signal information read from said picture memory into an analog signal supplied to said display means.

5. The circuit according to claim 1, wherein said decision-making means is arranged to make a decision as to the period of a horizontal synchronizing signal component obtained by separation in said synchronizing separator means, said decision-making means being arranged such that, if said period is within an allowable range centered about a prescribed period, said decision-making means identifies the presence of a signal to output a first decision signal, while if said period is without said allowable range, said decision-making means identifies the absence of a signal to output a second decision signal.

6. The circuit according to claim 1, wherein said clock-signal generating means comprises a signal generating source for generating a signal of predetermined frequency, means for dividing the frequency of a signal from said signal generating source, a first OR circuit for receiving said decision signal from said decision-making means and a frequency-divided output form said frequency dividing means, the decision signal having a high value in the absence of said broadcasting signal, a second OR circuit for receiving a signal from said signal generating means and a signal obtained by inverting said decision signal, and a AND circuit for receiving the respective outputs from said first and second OR circuit and outputting said clock signal to said address counter.

* * * * *